R. R. POLLAK.
APPARATUS FOR DEHYDRATING OIL.
APPLICATION FILED JULY 6, 1914.
1,254,271.
Patented Jan. 22, 1918.
2 SHEETS—SHEET 1.
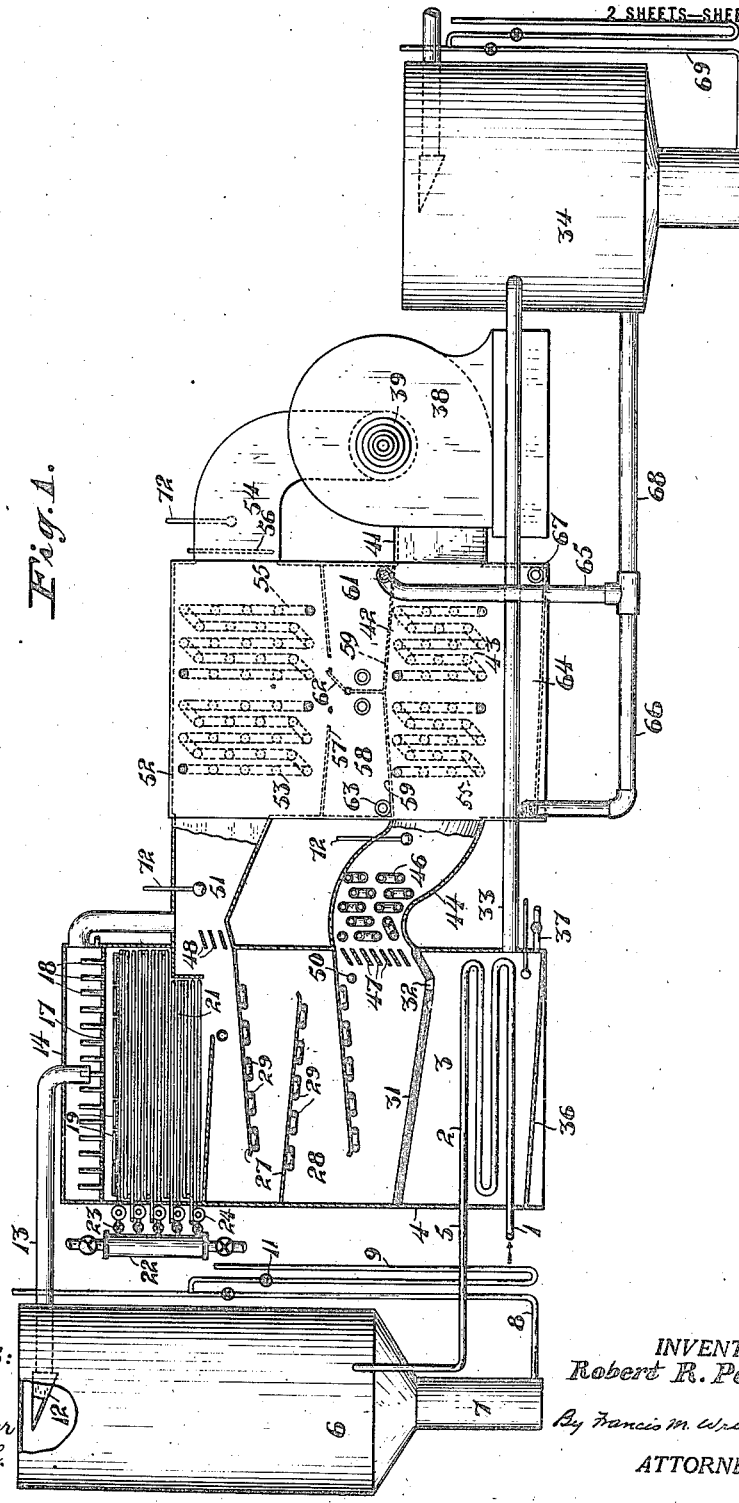
WITNESSES:
INVENTOR,
Robert R. Pollak
By Francis M. Wright,
ATTORNEY

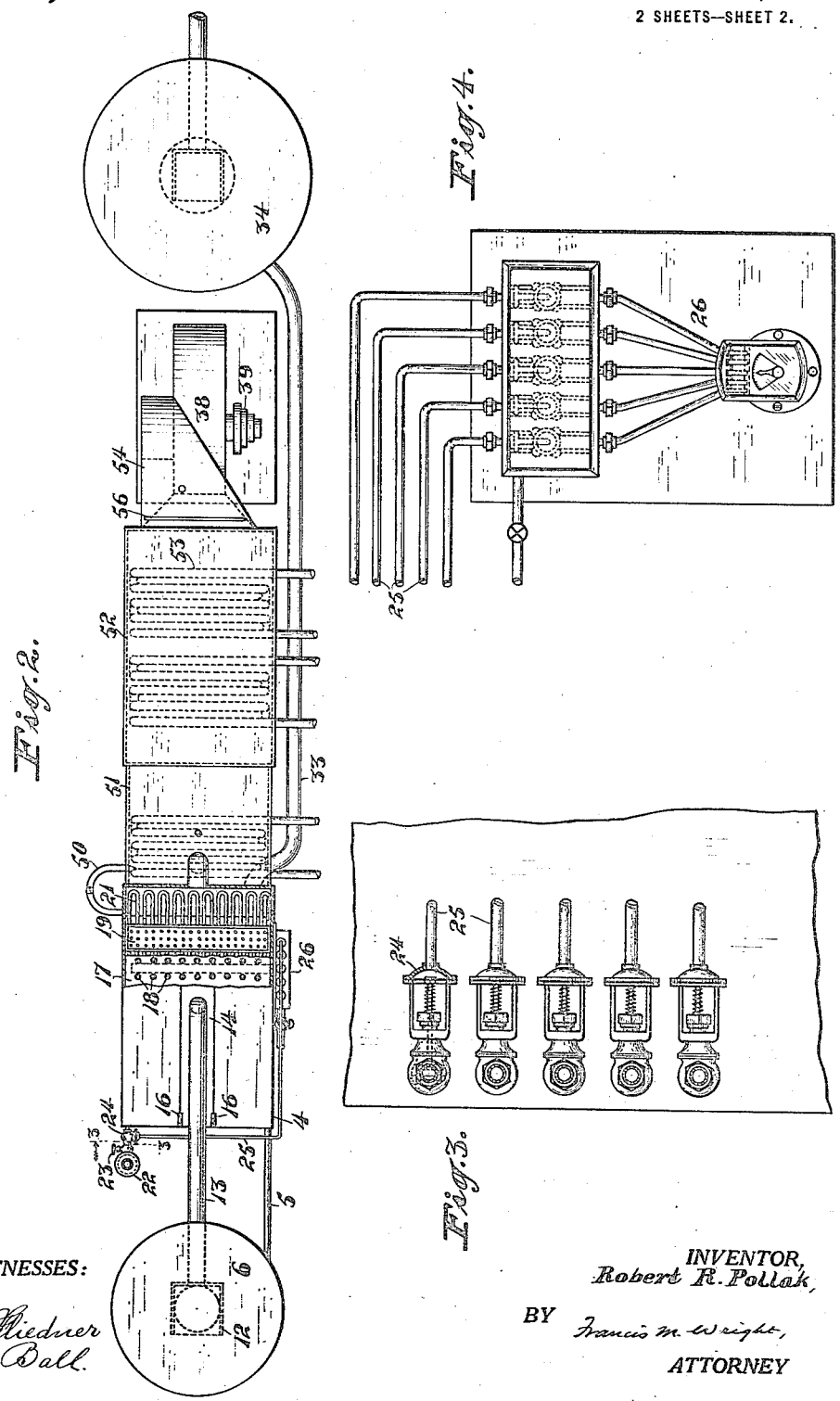

UNITED STATES PATENT OFFICE.

ROBERT R. POLLAK, OF SAN FRANCISCO, CALIFORNIA.

APPARATUS FOR DEHYDRATING OIL.

1,254,271. Specification of Letters Patent. Patented Jan. 22, 1918.

Application filed July 6, 1914. Serial No. 849,162.

*To all whom it may concern:*

Be it known that I, ROBERT R. POLLAK, a citizen of the United States, residing at San Francisco, in the county of San Francisco and State of California, have invented new and useful Improvements in Apparatus for Dehydrating Oil, of which the following is a specification.

Oil flowing from wells is generally mixed with water, either free, or forming with the water an emulsion, or partly free, and partly emulsified.

Free water is easily settled from the oil by gravitation.

When water forms an emulsion with the oil, the water is uniformly distributed throughout the oil in the form of very minute globules, which come together very slowly to form larger globules, which eventually separate as free water.

Known processes for treating polluted oil to separate it from water are, to heat the oil in the tank, to roast the oil, by which is meant passing it through the tubes of a boiler, to boil the oil over heating coils placed in earthen sumps, to separate it electrically, and, when the amount of water is unusually large, to erect a topping plant and crack the oil.

But it has been found that the refining quality of the oil is impaired by its being cracked, topped or even boiled too long.

The object of my invention is to provide a process and apparatus for dehydrating oil as rapidly as possible and at as low a temperature as possible to avoid destructive distillations of the oil, and furthermore to provide an apparatus the action of which can be varied according to the proportion of the emulsive contents and flow of the oil to be treated.

In the accompanying drawing, Figure 1 is a side elevation, certain parts being shown in vertical section of my improved apparatus; Fig. 2 is a plan view, certain parts being shown in horizontal section; Fig. 3 is an enlarged vertical section on the line 3—3 of Fig. 2; Fig. 4 is a broken detail front view of the part shown in Fig. 2.

The emulsion from the wells is stored in tanks to insure a steady flow of uniform volume. From said tanks, the emulsion is conducted by a pipe 1 to a coil 2 in a cooling chamber 3, at the bottom of a vessel 4, a pipe 5 leading from said coil to a receiving tank 6. Said tank is shaped to facilitate the separation of the free water, if any, from the emulsion, said free water settling in a lower reduced portion 7 of said tank and flowing therefrom into a pipe 8 leading to a height slightly above the level of the oil outlet from the tank 6. From said pipe 8 leads a U-shaped pipe 9 in which is a valve 11, the height of the outlet of said pipe 9 being such that a column of water therein, above the water line in the receiving tank 6, balances a column of oil in said tank above said water line. On the first admission of oil into said tank the valve 11 is closed, and when a sufficient amount of water has accumulated in the bottom of the tank the valve 11 is opened, and the water is automatically drained off from the tank, as it settles therein, by running out of the open end of the pipe 9. In the upper portion of said receiving tank is an open top trough 12, from which leads a pipe 13, passing through the side of the tank with an oil-tight joint, and entering the top 14 of the vessel 4. The sides of said top are hinged, as shown at 16, Fig. 2, to permit ready access to the interior of the vessel, and also to prevent the pressure therein becoming excessive. The emulsified oil flowing into said vessel drops on to a partition 17, having perforations around which extend upwardly open-ended tubes 18, all of the same height, so that the oil rises to the level of the tops of said tubes and drips therethrough. It then falls on to a horizontal series of perforated plates 19 which facilitate the subsequent dehydration of the oil by breaking it up into small globules. These globules fall onto coils of steam pipes 21, the successive vertical layers of said pipes being arranged in staggered relation with each other, so as to form a substantially continuous heating surface. Said pipes are supplied with steam from a header 22 and are controlled by individual hand valves 23, and also by diaphragm valves 24 controlled by compressed air pipes 25, the pressure in which is regulated by a thermostat 26.

By the heat of said pipes a considerable portion of the water is driven off in the form of steam from the emulsified oil. Said emulsion now drops on to the uppermost series of inclined perforated drip plates 27 in a vaporizing chamber 28 in the middle portion of the vessel 4, beneath which drip plates are coils of steam pipes 29, and in flowing down said drip plates, or dripping through the perforations therein, the emulsified particles are exposed to the drying action of an ascending current of hot dry air, obtained in the manner to be presently described. After passing the lowermost drip plate, the oil collects on a trough-shaped portion 31, which is double-sheeted and lined with insulating material, and passes through an opening 32 in said trough-shaped partition 31 into said cooling chamber 3, in which it is cooled by the comparatively cold oil in the cooling pipe 2, at the same time that the oil in the pipe 2 is heated by the oil in the chamber 3. From said cooling chamber the oil flows by a pipe 33 to an upper portion of a discharge tank 34. Any water that may collect on the sloping bottom 36 of the cooling chamber is drawn off from time to time by a pipe 37.

38 indicates a centrifugal blower rotated at a variable speed by a cone pulley 39 from any suitable source of power. By said blower, air is discharged into a conduit 41, passing thence through an auxiliary condensing chamber 42, containing cooling coils 43, carrying cold water or any other cooling medium, thence passing by a conduit 44 in which is a series of reheating coils 46, thence being deflected downwardly by baffles or louvers 47 on to the sloping partition 31, thence around and over the series of plates 27, thence through baffles or louvers 48 into a conduit 51, thence through a condenser 52, having therein two series of cooling coils 53, 55, thence into a conduit 54, regulated by a gate 56, and thence to the inlet mouth of the blower 38, by which it is again projected in the same path as before. By means of the condenser 42 nearly all the residual moisture is condensed from the air before it is reheated by the coils 46, so that the air is projected into the vaporizing chamber 28 hot and dry, taking up nearly all the residual moisture in the emulsion and also some of the more volatile constituents of the oil in the form of vapor. A valved pipe 50 Figs. 1, 2, discharges a small quantity of steam direct into the lower portion of the vaporizing chamber 28, so as to provide a blanket of air, more or less saturated with steam, which will prevent excessive evaporation of oil, and allow the aqueous particles of the emulsion to free themselves from the oil so that the water particles will unite at the bottom of the vaporizing chamber. The vapors of oil and water on arriving at the condenser 52 are for the most part condensed, the water being first condensed, at the higher temperature, by the condenser coils 53 and flowing on to a sloping bottom 57 and thence into a chamber 58, and the oil vapor being condensed at a lower temperature by the coils 55 and flowing on to a sloping bottom 59 and thence into a chamber 61. A movable partition 62 enables the location of the plane of separation of the water and oil to be varied according to the conditions. The water and oil are drawn off by pipes 63 and 65.

In the same way the oil and water condensed from their vapors in the auxiliary condenser 42 descend into a tank 64 and are drawn off by pipe connections 66 and 67. The light oils drawn from the chambers 61 and 64 are conducted by a pipe 68 to the lower portion of the discharge tank 34 below the inlet into said tank of the heavier oils and are thoroughly commingled with said heavy oils in said discharge tank. They are drawn off from said discharge tank by pipes 69, 71, similar to the pipes 8 and 9 already described.

By means of the automatic variation of the magnitude of the heating surface of the steam pipe 21 into which steam is permitted to enter by the thermostat 26, and by the regulation of the magnitude of the current of hot air, either by means of the gate or the speed of the blower, the apparatus is adapted for use with varying volumes of oil entering the vaporizing chamber.

The condensers are also regulated so as to vary the cooling effect to conform with variations in the vaporizing effect of the vaporizing chamber and to variations in the magnitude of the current from the blower.

The entire sides of the vaporizing chamber above the cooling chamber 13 are made air-tight and entirely removable for inspection of the coils, plates and the like, and provided with the necessary means for inspecting the interior. The top of the condenser 18 is also hinged to permit of automatic relief from any possible excess of pressure.

The flow of oil is effected by gravitation wherever practical and wherever back pressure is impossible; otherwise pumps are used, located in the most advantageous positions.

Thermometers 72 are placed in locations easy of access, where temperatures should be observed that indicate the necessity for varying the working conditions.

It will be observed that by means of this apparatus the oil leaving the discharge tanks may be at any temperature desired within reasonable limits, which fact facilitates the shipment of the oil, and avoids preheating in the ordinary shipping tanks, which is injurious to said tanks. It will also be observed that boiling of the oil, and the direct action of flame on vessels containing the oil are eliminated.

It will be observed that since, in this apparatus, the air for dehydration is circulated and used over and over again, and substantially no fresh air is drawn in, the minimum amount of oxidation of the oil by the air takes place.

I claim:—

1. An apparatus for dehydrating oil comprising a vessel, a vertical series of inclined, perforated drip plates, a pipe for conducting fluid into said vessel below said plates, a centrifugal blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

2. An apparatus for dehydrating oil comprising a vessel, a vertical series of inclined, perforated drip plates, coils of steam pipes beneath the several plates, a steam pipe for conducting steam into said vessel below said plates, a centrifugal blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

3. An apparatus for dehydrating oil comprising a vessel, a vertical series of inclined, perforated drip plates, coils of steam pipes beneath the several plates, a centrifugal blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

4. An apparatus for dehydrating oil comprising a vessel, coils of steam pipes therein, a vertical series of inclined, perforated drip plates below said steam pipes in said vessel, coils of steam pipes beneath the several plates, a steam pipe for conducting steam into said vessel below said plates, a centrifugal blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

5. An apparatus for dehydrating oil comprising a vessel, coils of steam pipes arranged therein in staggered relation with each other, a vertical series of inclined, perforated drip plates below said steam pipes in said vessel, coils of steam pipes beneath the several plates, a centrifugal blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

6. An apparatus for dehydrating oil comprising a vessel, coils of steam pipes arranged therein in staggered relation with each other, a vertical series of inclined, perforated drip plates below said steam pipes in said vessel, coils of steam pipes beneath the several plates, a steam pipe for conducting steam into said vessel below said plates, a centrifugal blower, means for regulating the speed of said blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

7. An apparatus for dehydrating oil comprising a vessel, coils of steam pipes arranged therein in staggered relation with each other, thermostatic means for controlling the supply of steam to said pipes, a vertical series of inclined, perforated drip plates below said steam pipes in said vessel, coils of steam pipes beneath the several plates, a centrifugal blower, means for regulating the speed of said blower, a conduit leading from said blower to said vessel, a condenser in said conduit, means in a further portion of the conduit for heating air therein, a conduit leading from an upper portion of the vessel to the blower, two condensers in different portions of said conduit and individual chambers for receiving the liquids condensed thereby.

8. An apparatus for dehydrating oil comprising a vessel, the top of which has a hinged portion, a perforated partition in said vessel, a horizontal series of perforated plates on to which the oil drips from said perforations, coils of steam pipes arranged in staggered relation with each other on to which said oil flows, means for controlling the supply of steam to said pipes by hand, thermostatic means for controlling said steam supply, a vertical series of inclined, perforated drip plates below said steam pipes in said vessel, coils of steam pipes beneath the several plates, a centrifugal blower, means for regulating the speed of said blower, a conduit leading from said blower to said vessel above the cooling chamber, a condenser in said conduit, means in a further portion of the conduit for heating air therein, a conduit leading from an upper portion of the vessel to the blower, two condensers in different portions of said conduit and individual chambers for receiving the liquids condensed thereby.

In testimony whereof I have hereunto set my hand in the presence of two subscribing witnesses.

ROBERT R. POLLAK.

Witnesses:
  F. M. WRIGHT,
  D. B. RICHARDS.